United States Patent
Yang et al.

(10) Patent No.: US 9,892,711 B2
(45) Date of Patent: Feb. 13, 2018

(54) MEDICAL IMAGING SYSTEM

(71) Applicant: OPTICIS CO., LTD., Gyeonggi-do (KR)

(72) Inventors: Dong Pyeong Yang, Gyeonggi-do (KR); Jae Chul Ko, Gyeonggi-do (KR); Doo Soo Ha, Gyeonggi-do (KR); Won Gil Byun, Gyeonggi-do (KR)

(73) Assignee: OPTICIS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/423,751

(22) Filed: Feb. 3, 2017

(65) Prior Publication Data

US 2017/0221446 A1    Aug. 3, 2017

(30) Foreign Application Priority Data

Feb. 3, 2016 (KR) .......................... 10-2016-0013545

(51) Int. Cl.
G09G 5/00 (2006.01)
H04N 11/20 (2006.01)

(52) U.S. Cl.
CPC ............ G09G 5/005 (2013.01); H04N 11/20 (2013.01); G09G 2370/042 (2013.01); G09G 2370/12 (2013.01); G09G 2370/22 (2013.01)

(58) Field of Classification Search
CPC .......... G09G 5/005; G09G 2370/042; G09G 2370/22; H04N 11/20
See application file for complete search history.

(56) References Cited

U.S. PATENT DOCUMENTS

| | | | |
|---|---|---|---|
| 4,739,521 A | | 4/1988 | Akimoto |
| 6,941,395 B1 * | | 9/2005 | Galang ................. H04N 7/108 |
| | | | 174/113 R |
| 7,295,194 B2 | | 11/2007 | Lee |
| 7,406,607 B2 | | 7/2008 | Echizenya |
| 2003/0034963 A1 | | 2/2003 | Moon et al. |
| 2006/0246772 A1 | | 11/2006 | Yamaguchi et al. |
| 2007/0225590 A1 * | | 9/2007 | Ramos ..................... A61B 8/12 |
| | | | 600/407 |
| 2013/0175992 A1 * | | 7/2013 | Tinaphong ............ H02J 7/0004 |
| | | | 320/111 |
| 2014/0253673 A1 | | 9/2014 | Barredo |

FOREIGN PATENT DOCUMENTS

| | | |
|---|---|---|
| EP | 2824658 A2 | 1/2015 |
| JP | 2549506 B2 | 8/1996 |
| KR | 100458499 B1 | 11/2004 |
| KR | 100584621 B1 | 5/2006 |
| WO | 2008084936 A1 | 7/2008 |

OTHER PUBLICATIONS

Office Action dated Mar. 27, 2017 of the Korean Patent Application No. 10-2016-0013545.
Extended European Search Report dated May 4, 2017 of the European Patent Application No. 17151211.4.

* cited by examiner

*Primary Examiner* — Michael Teitelbaum
(74) *Attorney, Agent, or Firm* — Nixon Peabody LLP; Jeffrey L. Costellia

(57) ABSTRACT

Provided is a medical imaging system including medical equipment, a wall-plate converter, and a mobile near-source converter (NSC). The wall-plate converter supplies direct current (DC) power to the mobile NSC via a connection cable interposed between the mobile NSC and the wall-plate converter.

5 Claims, 5 Drawing Sheets

MEDICAL IMAGING SYSTEM

CROSS-REFERENCE TO RELATED APPLICATION

This application claims the benefit of Korean Patent Application No. 10-2016-0013545, filed on Feb. 3, 2016, in the Korean Intellectual Property Office, the disclosure of which is incorporated herein in its entirety by reference.

BACKGROUND

1. Field

One or more embodiments relate to a medical imaging system, and more particularly, to a medical imaging system including medical equipment, a wall-plate converter, and a mobile near-source converter (NSC).

2. Description of the Related Art

A general medical imaging system includes medical equipment, a wall-plate converter, and a mobile near-source converter (NSC).

In the general medical imaging system, the medical equipment includes a camera to generate an image signal.

The wall-plate converter is mounted on a wall of a room where the medical equipment is located and converts a digital image signal in a specific format into an optical signal for transmission to a display.

The mobile NSC is mounted on a mobile device to convert the image signal from the medical equipment into the digital image signal in the specific format and input a conversion result, i.e., the digital image signal in the specific format, to the wall-plate converter.

In a medical imaging system as described above, a mobile NSC may be positioned between medical equipment and a wall-plate converter to be used. Thus, depending on locations of the medical equipment and the wall-plate converter, the position of the mobile NSC may vary.

When a power outlet is located far away from the mobile NSC, it may take a considerable amount of time to supply direct current (DC) power to the mobile NSC. This may possibly hamper treatment of an emergency patient.

The above-described problems associated with the related art have been known to and prompted the inventor to derive the present invention or have been learned in the process of deriving the same. However, the problems are not necessarily considered as being known to the general public before the filing date of the invention.

SUMMARY

One or more embodiments include a medical imaging system adapted to prevent treatment of a patient being hampered in an emergency situation.

Additional aspects will be set forth in part in the description which follows and, in part, will be apparent from the description, or may be learned by practice of the presented embodiments.

According to one or more embodiments, a medical imaging system includes medical equipment, a wall-plate converter, and a mobile near-source converter (NSC).

The medical equipment includes a camera to generate an image signal.

The wall-plate converter is mounted on a wall of an indoor space where the medical equipment is located and configured to convert a digital image signal in a specific format into an optical signal and transmit the optical signal to a display.

The mobile NSC is mounted on a mobile device to convert the image signal from the medical equipment into the digital image signal in the specific format and input, to the wall-plate converter, the digital image signal in the specific format that is a result of the converting.

The wall plate converter is further configured to supply direct current (DC) power to the mobile NSC via a connection cable interposed between the mobile NSC and the wall-plate converter.

The digital image signal in the specific format is an image signal in a digital visual interface (DVI) format, and the connection cable interposed between the mobile NSC and the wall-plate converter is a DVI cable.

The wall-plate converter is further configured to supply the DC power to the mobile NSC via a display data channel (DDC) 5V additional-signal line in the connection cable.

The mobile NSC includes a memory for storing a preset identification code therein, and the wall-plate converter is further configured to supply the DC power to the mobile NSC after verifying the preset identification code stored in the memory of the mobile NSC.

The wall-plate converter is further configured to preferentially supply DC power to the memory of the mobile NSC via a hot plug detection (HPD) additional-signal line in the connection cable.

The mobile NSC is positioned between the medical equipment and the wall-plate converter to be used. In other words, the position of the mobile NSC may always vary.

In the medical imaging system according to the embodiment, the wall-plate converter supplies DC power to the mobile NSC via the connection cable interposed between the mobile NSC and the wall-plate converter. The mobile NSC may then be connected to the wall-plate converter to immediately receive the DC power therefrom. With this configuration, it is possible to solve the conventional problem that it may take a considerable amount of time to supply power to the mobile NSC, thereby preventing treatment of a patient being hampered in an emergency situation.

Furthermore, as described above, the mobile NSC includes the memory for storing the set identification code therein, and the wall-plate converter is further configured to supply DC power to the mobile NSC after verifying the identification code stored in the memory of the mobile NSC.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The following description and the accompanying drawings are intended to understand operations according to the present disclosure, and parts that can be easily implemented by one of ordinary skill in the art are omitted.

Furthermore, the present specification and the figures are not provided for purposes of limitation, and the scope of the inventive concept should be defined by the claims. The terms used in this specification are chosen to best describe the inventive concept and should be interpreted based on the meaning and concept corresponding to technical aspects of the present disclosure.

Hereinafter, embodiments will be described more fully with reference to the attached drawings.

Figure 1:
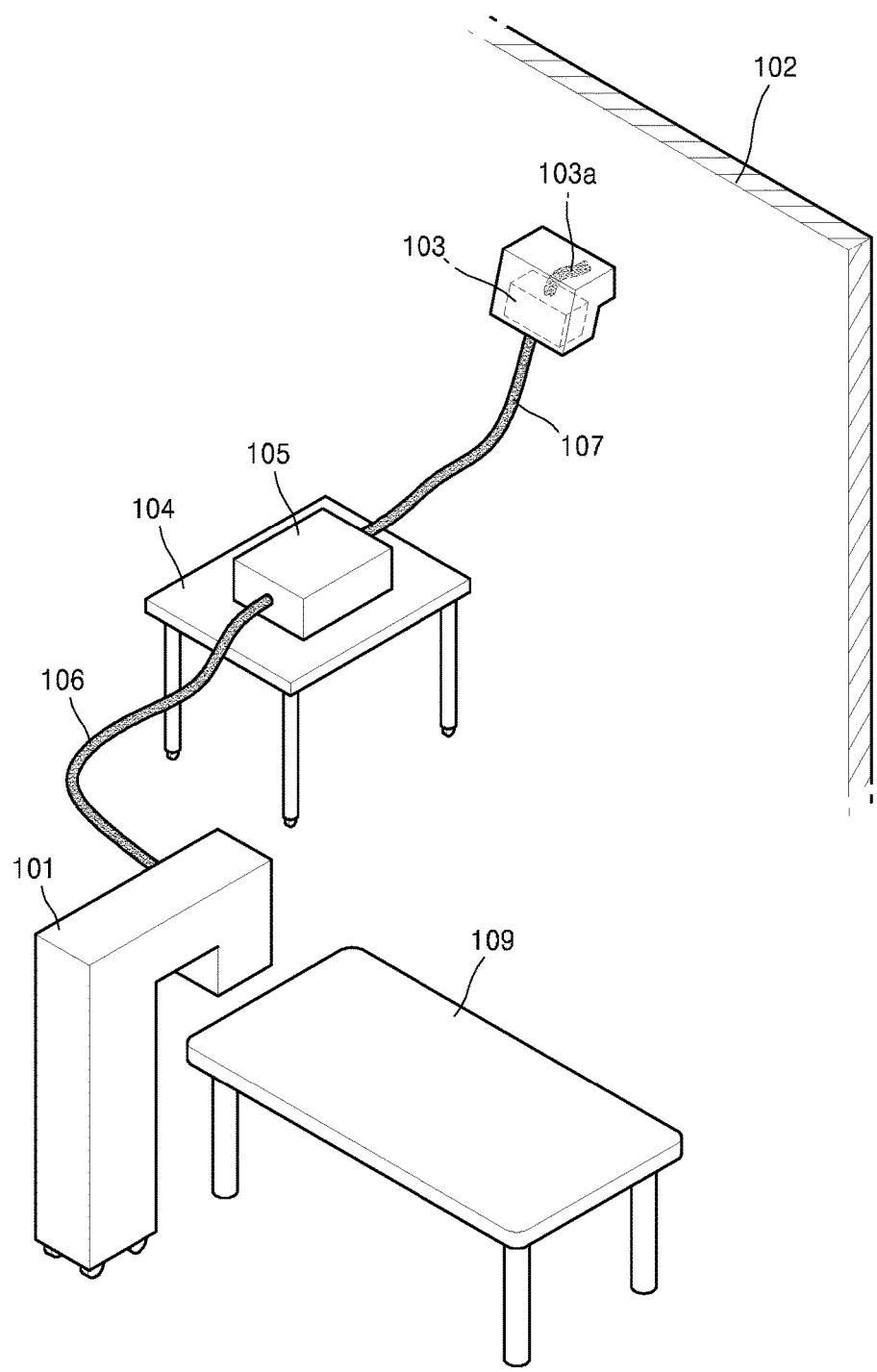
FIG. 1 illustrates a medical imaging system according to an embodiment.

FIG. 1 illustrates a medical imaging system according to an embodiment. In FIG. 1, reference numeral 109 denotes a bed, e.g., an operating table, on which a patient is positioned during treatment.

Referring to FIG. 1, the medical imaging system according to the present embodiment includes medical equipment 101, a wall-plate converter 103, and a mobile NSC 105.

The medical equipment 101 is used to treat patients and is provided with a camera (not shown) to generate an image signal.

The wall-plate converter 103 is mounted on a wall 102 of an indoor space where the medical equipment 101 is located and converts a digital image signal in a specific format into an optical signal for transmission to a display (not shown). In other words, the optical signal from the wall-plate converter 103 is transmitted to the display via an optical cable 103a. An optical receiver (not shown) located at a side of the display then converts the optical signal back into the digital image signal in the specific format and inputs the digital image signal to the display.

The mobile NSC 105 is mounted on a mobile device 104 and converts the image signal from the medical equipment 101 into the digital image signal in the specific format and inputs a conversion result, i.e., the digital image signal in the specific format, to the wall-plate converter 103.

Here, the wall-plate converter 103 then supplies direct current (DC) power to the mobile NSC 105 via a connection cable 107 interposed between the mobile NSC 105 and the wall-plate converter 103.

The mobile NSC 105 is then connected to the wall-plate converter 103 to immediately receive the DC power therefrom. This configuration may solve the conventional problem that it takes a considerable amount of time to supply power to the mobile NSC 105, thereby preventing treatment of a patient being hampered in an emergency situation.

According to the present embodiment, the digital image signal in the specific format is an image signal in a digital visual interface (DVI) format. Furthermore, the connection cable 107 between the mobile NSC 105 and the wall-plate converter 103 is a DVI cable.

The wall-plate converter 103 supplies the DC power to the mobile NSC 105 via a display data channel (DDC) 5V additional-signal line in the connection cable 107.

The mobile NSC 105 has a memory for storing a preset identification code therein. After verifying the preset identification code stored in the memory of the mobile NSC 105, the wall-plate converter 103 supplies DC power to the mobile NSC 105.

Thus, according to the present embodiment, even when an imaging device other than the mobile NSC 105 connects to the wall-plate converter 103, power collision caused by the other imaging device may be prevented.

The wall-plate converter 103 preferentially supplies DC power to the memory of the mobile NSC 105 via a hot plug detection (HPD) additional-signal line in the connection cable 107.

According to the present embodiment, the image signal from the medical equipment 101 is an image signal in a serial digital interface (SDI) or video graphics array (VGA) format. In other words, a connection cable 106 interposed between the medical equipment 101 and the mobile NSC 105 is an SDI or VGA cable.

Figure 2:
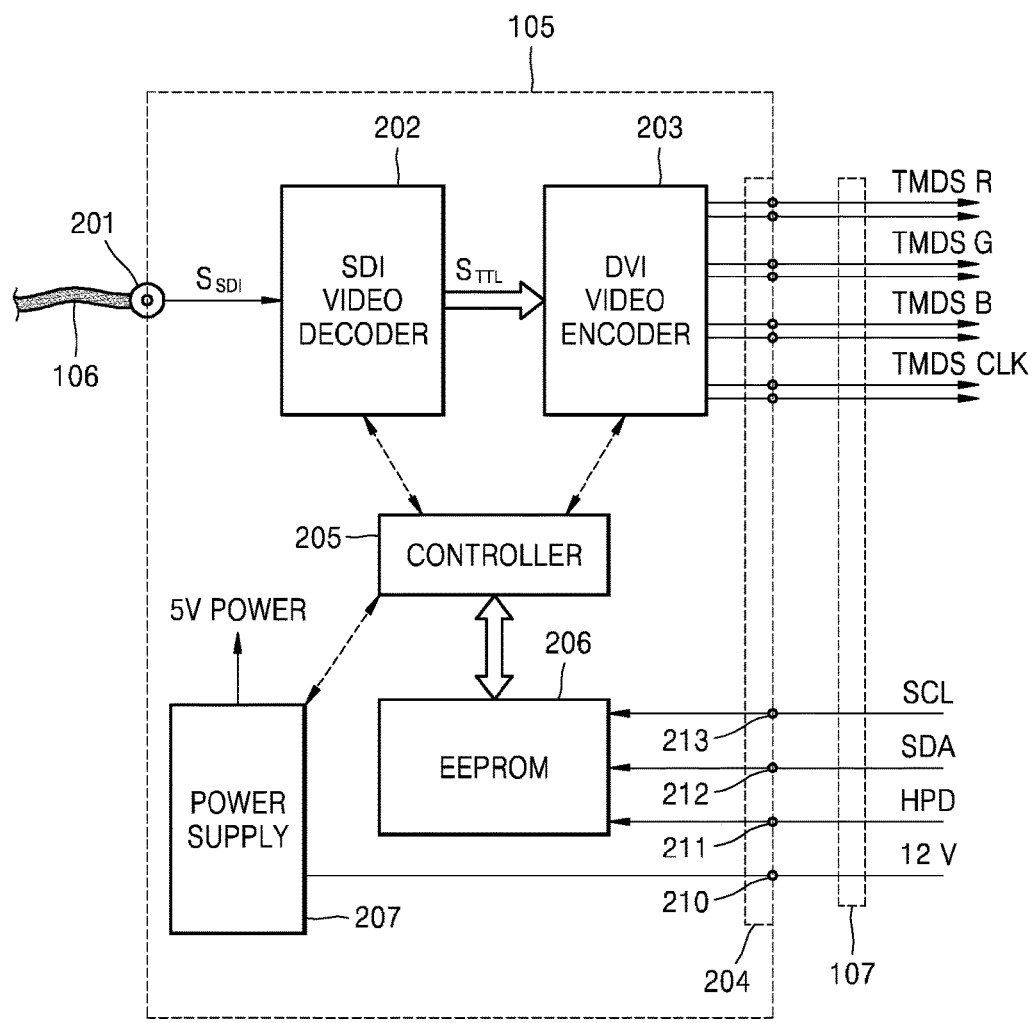
FIG. 2 is a block diagram of an internal configuration of a mobile near-source converter (NSC) included in the medical imaging system of FIG. 1 when an image signal in a serial digital interface (SDI) format is output from medical equipment in FIG. 1 and an image signal in a digital visual interface (DVI) format is transmitted to a display.

FIG. 2 is a block diagram of an internal configuration of the mobile NSC 105 described with reference to FIG. 1 when an image signal $S_{SDI}$ in an SDI format is output from the medical equipment 101 in FIG. 1 and an image signal in a DVI format is transmitted to the display. In FIG. 2, reference numerals 201 and 204 respectively represent an SDI cable connector and a DVI cable connector. In the DVI cable connector 204, reference numerals 210 through 213 respectively denote a DDC 5V additional-signal terminal, a HPD additional-signal terminal, a serial data SDA terminal, and a serial clock SCL terminal.

Like reference numerals refer to like elements in FIGS. 1 and 2. The internal configuration and operation of the mobile NSC 105 will now be described with reference to FIGS. 1 and 2.

Referring to FIGS. 1 and 2, the mobile NSC 105 includes an SDI video decoder 202, the DVI cable connector 204, a DVI video encoder 203, a controller 205, a power supply 207, and an electrically programmable read only memory (EEPROM) 206 as a memory.

The SDI video decoder 202 converts the image signal $S_{SID}$ from the medical equipment 101 into a digital red-green-blue (RGB) signal $S_{TTL}$ in a low voltage transistor-transistor logic (LVTTL) format.

The DVI video encoder 203 converts the digital RGB signal $S_{TTL}$ from the SDI video decoder 202 into DVI image-data signals TMDS R, TMDS G, TMDS B, and TMDS CLK that are then output to the DVI cable connector 204.

The controller 205 such as a microcomputer controls operations of the SDI video decoder 202 and the DVI video encoder 203.

The power supply 207 operates using 12V DC power, which is supplied via the DDC 5V additional-signal terminal 210 of the DVI cable connector 204, to prevent power collisions and supply 5V DC power to the SDI video decoder 202, the DVI video encoder 203, and the controller 205.

The EEPROM 206 as a memory stores a preset identification code and operates using 5V DC power, which is supplied via the HPD additional-signal terminal 211 of the DVI cable connector 204, to perform DDC communication via the serial clock SCL terminal 213 and the serial data SDA terminal 212 of the DVI cable connector 204. According to the present embodiment, the DDC communication is performed based on an Inter-integrated circuit (I2C) communication protocol.

Figure 3:
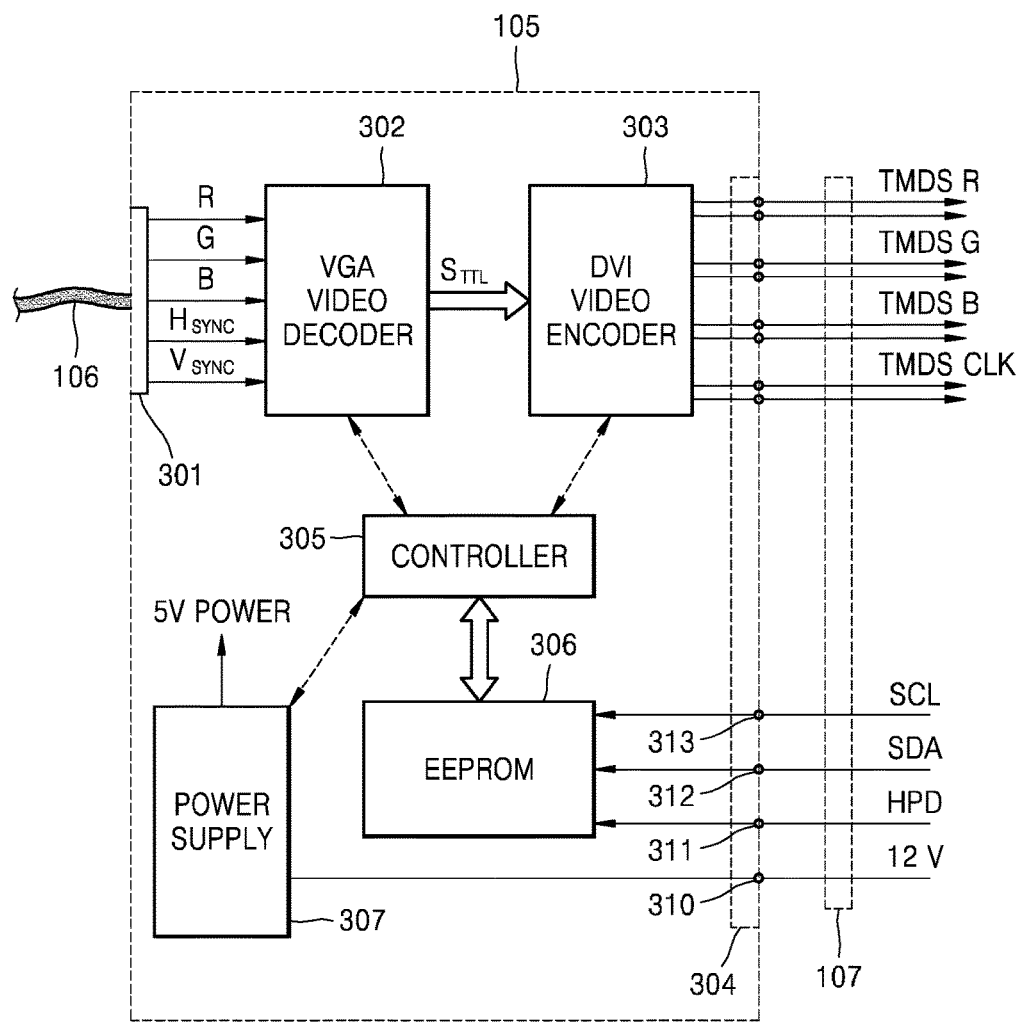
FIG. 3 is a block diagram of an internal configuration of the mobile NSC included in the medical imaging system of FIG. 1 when an image signal in a video graphics array (VGA) format is output from the medical equipment in FIG. 1 and an image signal in a DVI format is transmitted to a display.

FIG. 3 is a block diagram of an internal configuration of the mobile NSC 105 described with reference to FIG. 1 when image signals R, G, B, $H_{SYNC}$, and $V_{SYNC}$ in a VGA format are output from the medical equipment 101 in FIG. 1 and an image signal in a DVI format is transmitted to the display. In FIG. 3, reference numerals 301 and 304 respectively represent a VGA cable connector and a DVI cable connector. In the DVI cable connector 304, reference numerals 310 through 313 respectively denote a DDC additional-signal terminal, a HPD additional-signal terminal, a serial data SDA terminal, and a serial clock SCL terminal.

Like reference numerals refer to like elements in FIGS. 1 and 3. The internal configuration and operation of the mobile NSC 105 will now be described with reference to FIGS. 1 and 3.

Referring to FIGS. 1 and 3, the mobile NSC 105 includes a VGA video decoder 302, a VGA video encoder 303, the DVI cable connector 304, a controller 305, a power supply 307, and an EEPROM 306 as a memory.

The VGA video decoder 302 converts the image signals R, G, B, $H_{SYNC}$, and $V_{SYNC}$ in the VGA format from the medical equipment 101 into a digital RGB signal $S_{TTL}$ in the LVTTL format.

The DVI video encoder 303 converts the digital RGB signal $S_{TTL}$ from the VGA video decoder 302 into DVI image-data signals TMDS R, TMDS G, TMDS B, and TMDS CLK that are then output to the DVI cable connector 304.

The controller 305 controls operations of the VGA video decoder 302 and the DVI video encoder 303.

The power supply 307 operates using 12V DC power, which is supplied via the DDC 5V additional-signal terminal 310 of the DVI cable connector 304, to prevent power collision and supply 5V DC power to the VGA video decoder 302, the DVI video encoder 303, and the controller 305.

The EEPROM 306 as a memory stores a preset identification code and operates using 5V DC power, which is supplied via the HPD additional-signal terminal 311 of the DVI cable connector 304, to perform DDC communication via the serial clock SCL terminal 313 and the serial data SDA terminal 312 of the DVI cable connector 304.

Figure 4:
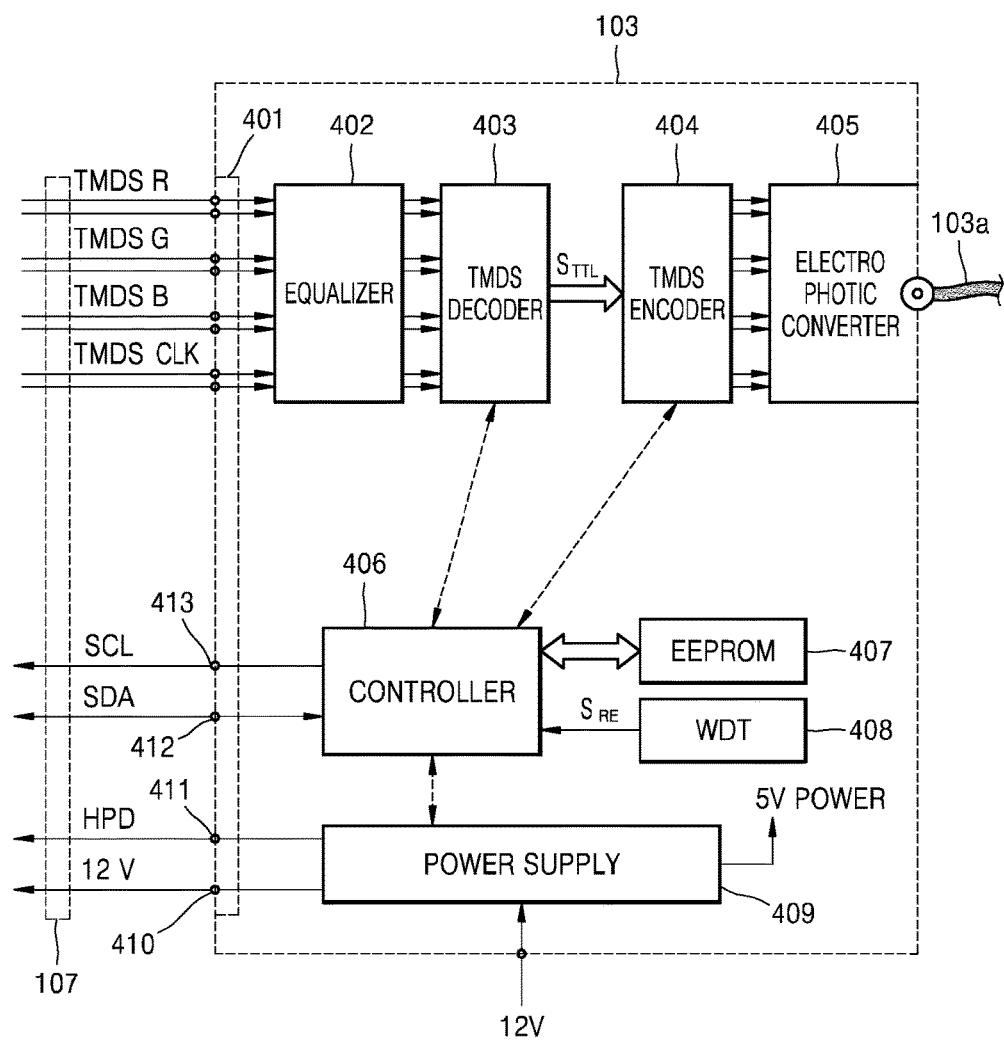
FIG. 4 is a block diagram of an internal configuration of a wall-plate converter included in the medical imaging system of FIG. 1 when a DVI cable is connected between the mobile NSC and the wall-plate converter in FIG. 1.

FIG. 4 is a block diagram of an internal configuration of the wall-plate converter 103 described with reference to FIG. 1 when the connection cable 107 is connected between the mobile NSC 105 and the wall-plate converter 103 in FIG. 1. Like reference numerals refer to like elements in FIGS. 1 and 4. The internal configuration and operation of the wall-plate converter 103 will now be described with reference to FIGS. 1 and 4.

Referring to FIGS. 1 and 4, the wall-plate converter 103 includes a DVI cable connector 401, an equalizer 402, a transition minimized differential signaling (TMDS) decoder 403, a TMDS encoder 404, an electrophotic converter 405, a power supply 409, an EEPROM 407 as a memory, and a controller 406. In FIG. 4, reference numeral 408 denotes a watch-dog timer (WDT) for inputting a reset signal $S_{RE}$ to the controller 406 when the controller 406 such as a microcomputer performs an abnormal operation.

The equalizer 402 shapes waveforms of DVI image-data signals TMDS R, TMDS G, TMDS B, and TMDS CLK output from the DVI cable connector 401.

The TMDS decoder 403 converts the DVI image-data signals TMDS R, TMDS G, TMDS B, and TMDS CLK from the equalizer 402 into a digital RGB signal $S_{TTL}$ in an LVTTL format.

The TMDS encoder 404 converts the digital RGB signal $S_{TTL}$ from the TMDS decoder 403 into DVI signals TMDS R, TMDS G, TMDS B, and TMDS CLK in a TMDS format.

The electrophotic converter 405 converts the DVI signals TMDS R, TMDS G, TMDS B, and TMDS CLK from the TMDS encoder 404 into an optical signal and outputs the optical signal to the optical cable 103a. In this case, the electrophotic converter 405 may reduce the number of optical channels by using Coarse Wavelength Division Multiplexing (CWDM).

The power supply 409 operates using 12V DC power from the outside to prevent power collision and supply 5V power to each component of the wall-plate converter 103.

The EEPROM 407 stores Extended Display Identification Data (EDID) provided by a display (not shown).

The controller 406 controls operations of the TMDS decoder 403 and the TMDS encoder 404 according to the EDID stored in the EEPROM 407. Thus, the TMDS decoder 403 and the TMDS encoder 404 may be additionally used.

In addition, the controller 405 performs the following initialization operations.

The controller 406 controls the power supply 409 to supply 5V DC power to the mobile NSC 105 via a HPD additional-signal line 411. Then, the controller 406 performs DDC communication via a serial clock SCL terminal 413 and a serial data SDA terminal 412 of the DVI cable connector 401. After an identification code of the mobile NSC 105 is verified via the DDC communication, the controller 406 controls the power supply 409 to supply 12V DC power to the mobile NSC 105 via a DDC 5V additional-signal terminal 410 of the DVI cable connector 401.

Thus, even when an imaging device other than the mobile NSC 105 connects to the wall-plate converter 103, power collision caused by the other imaging device may be prevented. Operations of the controller 406 related to this case will now be described with reference to FIG. 5.

Figure 5:
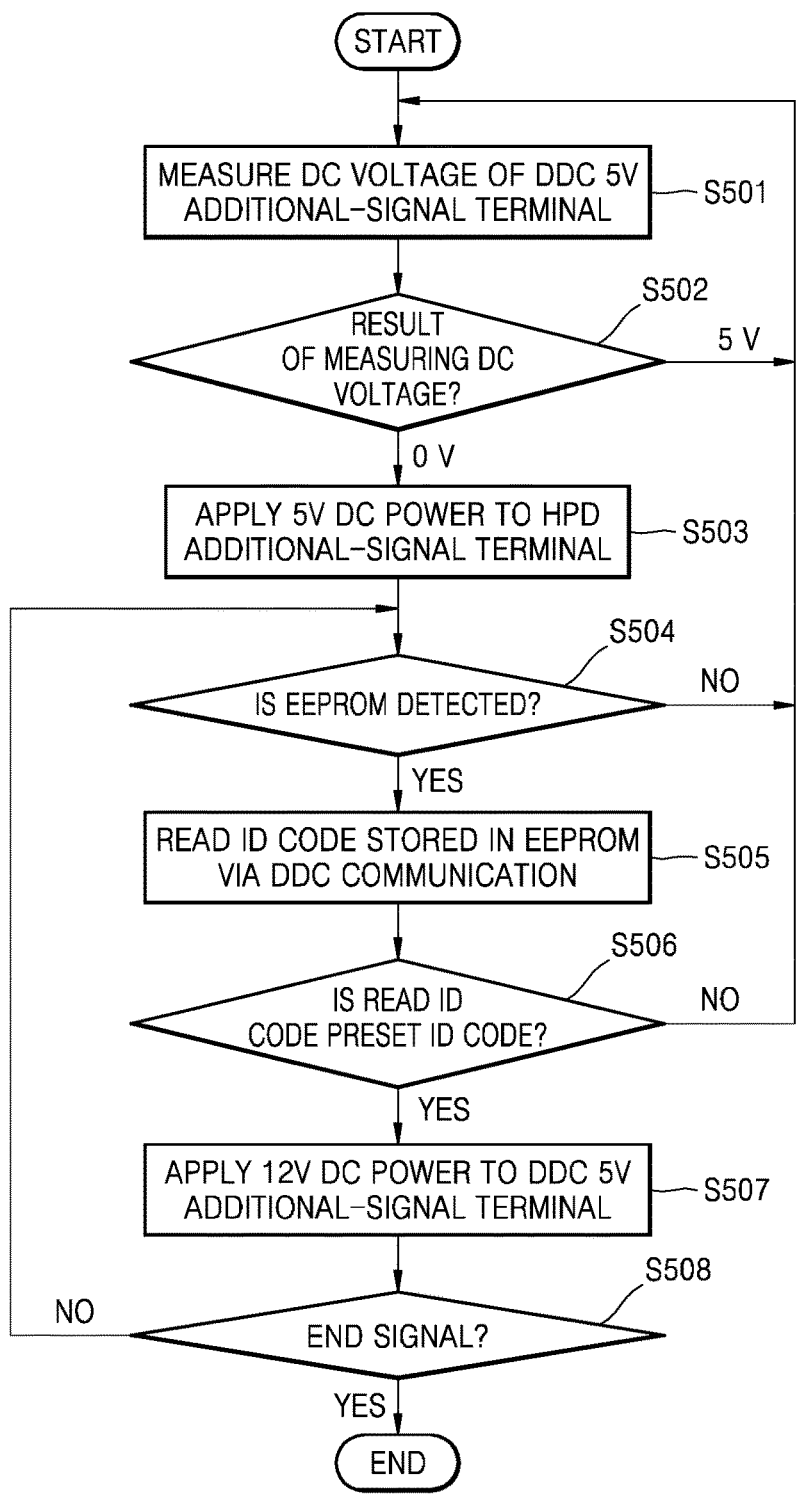
FIG. 5 is a flowchart of an algorithm, performed by a controller in FIG. 4, for supplying power to a mobile NSC.

FIG. 5 is a flowchart of an algorithm, performed by the controller 406 in FIG. 4, for supplying power to the mobile NSC 105 in FIG. 1. The algorithm will now be described with reference to FIGS. 4 and 5.

Referring to FIGS. 4 and 5, first, the controller 406 controls the power supply 409 to measure a DC voltage of the DDC 5V additional-signal terminal 410 of the DVI cable connector 401 (S501).

If the DC voltage of the DDC 5V additional-signal terminal 410 is not applied (S502), the controller 406 performs operation S503 and its subsequent operations.

The controller 406 controls the power supply 409 to apply 5V DC power to the HPD additional-signal terminal 411 (S503).

Then, the controller 406 determines whether the EEPROM (206 of FIG. 2 or 306 of FIG. 3) of the mobile NSC 105 is detected while performing DDC communication via the serial clock SCL terminal 413 and the serial data SDA terminal 412 (S504).

If the EEPROM 206 or 306 is detected in operation S504, the controller 406 reads an identification code stored in the EEPROM 206 or 306 via the DDC communication (S505).

Subsequently, it is determined whether the read identification code is a preset identification code (S506).

If it is determined that the read identification code is the preset identification code, the controller 406 controls the power supply 409 to apply 12V DC power to the DDC 5V additional-signal terminal 410 of the DVI cable connector 401 (S507).

Operations S504 through S507 are repeated periodically until an end signal is generated (S508).

As described above, a mobile NSC is positioned between medical equipment and a wall-plate converter to be used. In other words, the position of the mobile NSC may always vary.

In a medical imaging system according to an embodiment, the wall-plate converter supplies DC power to the mobile NSC via a connection cable interposed between the mobile NSC and the wall-plate converter. The mobile NSC may then be connected to the wall-plate converter to immediately receive the DC power therefrom. With this configuration, it is possible to solve the conventional problem that it may take a considerable amount of time to supply power to the mobile NSC, thereby preventing treatment of a patient being hampered in an emergency situation.

Furthermore, the mobile NSC includes a memory for storing a preset identification code therein, and the wall-plate converter is configured to supply DC power to the mobile NSC after verifying the identification code stored in the memory of the mobile NSC.

Thus, even when an imaging device that is other than the mobile NSC connects to the wall-plate converter, power collision caused by the other imaging device may be prevented.

While one or more embodiments have been described with reference to the figures, it will be understood by those of ordinary skill in the art that various changes in form and details may be made therein without departing from the spirit and scope of the disclosure as defined by the following claims.

Thus, it should be understood that the exemplary embodiments described therein should be considered in a descriptive sense only and not for purposes of limitation. The scope of the inventive concept is defined not by the detailed description thereof but by the appended claims, and all differences within the scope of the appended claims and their equivalents will be construed as being included in the present inventive concept.

What is claimed is:

1. A medical imaging system comprising:
    medical equipment including a camera to generate an image signal;
    a wall-plate converter mounted on a wall of an indoor space where the medical equipment is located and configured to convert a digital image signal in a specific format into an optical signal and transmit the optical signal to a display; and
    a mobile near-source converter (NSC) mounted on a mobile device to convert the image signal from the medical equipment into the digital image signal in the specific format and input, to the wall-plate converter, the digital image signal in the specific format that is a result of the converting,
    wherein the wall plate converter is further configured to supply direct current (DC) power to the mobile NSC via a connection cable interposed between the mobile NSC and the wall-plate converter,
    wherein the digital image signal in the specific format is an image signal in a digital visual interface (DVI) format,
    wherein the connection cable interposed between the mobile NSC and the wall-plate converter is a DVI cable,
    wherein the wall-plate converter is further configured to supply the DC power to the mobile NSC via a display data channel (DDC) 5V additional-signal line in the connection cable.

2. The medical imaging system of claim 1, wherein the mobile NSC comprises a memory for storing a preset identification code therein, and
    wherein the wall-plate converter is further configured to supply the DC power to the mobile NSC after verifying the preset identification code stored in the memory of the mobile NSC.

3. The medical imaging system of claim 2, wherein the wall-plate converter is further configured to preferentially supply DC power to the memory of the mobile NSC via a hot plug detection (HPD) additional-signal line in the connection cable.

4. A medical imaging system comprising:
    medical equipment including a camera to generate an image signal;
    a wall-plate converter mounted on a wall of an indoor space where the medical equipment is located and configured to convert a digital image signal in a specific format into an optical signal and transmit the optical signal to a display; and
    a mobile near-source converter (NSC) mounted on a mobile device to convert the image signal from the medical equipment into the digital image signal in the specific format and input, to the wall-plate converter, the digital image signal in the specific format that is a result of the converting,
    wherein the wall plate converter is further configured to supply direct current (DC) power to the mobile NSC via a connection cable interposed between the mobile NSC and the wall-plate converter,
    wherein the digital image signal in the specific format is an image signal in a digital visual interface (DVI) format,
    wherein the connection cable interposed between the mobile NSC and the wall-plate converter is a DVI cable,
    wherein the image signal from the medical equipment is an image signal in a serial digital interface (SDI) or video graphics array (VGA) format,
    wherein the mobile NSC comprises:
    a video decoder configured to convert the image signal, which is in the SDI or VGA format and output from the medical equipment, into a digital red-green-blue (RGB) signal in a low voltage transistor-transistor logic (LVTTL) format;
    a DVI cable connector;
    a DVI video encoder configured to convert the digital RGB signal from the video decoder into DVI image-data signals and output the DVI image-data signals to the DVI cable connector;
    a controller configured to control operations of the video decoder and the DVI video encoder;
    a power supply configured to operate using DC power, which is supplied via a display data channel (DDC) 5V additional-signal terminal of the DVI cable connector, to prevent power collision and to supply power to the video decoder, the DVI video encoder, and the controller; and
    a memory configured to store a preset identification code, and operate using DC power, which is supplied via a hot plug detection (HPD) additional-signal terminal of the DVI cable connector, to perform DDC communication via a serial clock terminal and a serial data terminal of the DVI cable connector.

5. A medical imaging system comprising:
    medical equipment including a camera to generate an image signal;
    a wall-plate converter mounted on a wall of an indoor space where the medical equipment is located and configured to convert a digital image signal in a specific format into an optical signal and transmit the optical signal to a display; and
    a mobile near-source converter (NSC) mounted on a mobile device to convert the image signal from the medical equipment into the digital image signal in the specific format and input, to the wall-plate converter, the digital image signal in the specific format that is a result of the converting, wherein the wall plate converter is further configured to supply direct current (DC) power to the mobile NSC via a connection cable interposed between the mobile NSC and the wall-plate converter, wherein the digital image signal in the specific format is an image signal in a digital visual interface (DVI) format, wherein the connection cable interposed between the mobile NSC and the wall-plate converter is a DVI cable, wherein the wall-plate converter comprises:

a DVI cable connector;

an equalizer configured to shape waveforms of DVI image-data signals from the DVI cable connector;

a transition minimized differential signaling (TMDS) decoder configured to convert the DVI image-data signals from the equalizer into a digital red-green-blue (RGB) signal in a low voltage transistor-transistor logic (LVTTL) format;

a TMDS encoder configured to convert the digital RGB signal from the TMDS decoder into DVI signals in a TMDS format;

an electrophotic converter configured to convert the DVI signals from the TMDS encoder into an optical signal and output the optical signal to an optical cable;

a power supply configured to operate using DC power from the outside to prevent power collision and supply power to each component of the wall-plate converter; and a controller configured to control operations of the TMDS decoder and the TMDS encoder according to extended display identification data (EDID) and control the power supply to supply DC power to the mobile NSC via a display data channel (DDC) 5V additional-signal terminal of the DVI cable connector.

* * * * *